United States Patent

Sugiyama et al.

[11] 3,878,718
[45] Apr. 22, 1975

[54] TURBINE-TYPE FLOWMETER

[75] Inventors: Shigeo Sugiyama, Fujisawa; Masahiro Soya, Kawasaki; Hiroyuki Amemori, Tokyo, all of Japan

[73] Assignee: Tokico Ltd., Kawasaki Kanagawa-ken, Japan

[22] Filed: July 24, 1973

[21] Appl. No.: 382,182

[30] Foreign Application Priority Data
July 27, 1972  Japan................................. 47-75347
Jan. 22, 1973  Japan................................. 48-9370

[52] U.S. Cl.............................................. 73/231 R
[51] Int. Cl............................................... G01f 1/00
[58] Field of Search..... 73/229, 230, 231 R, 231 M; 324/173, 174

[56] References Cited
UNITED STATES PATENTS
3,238,776   3/1966   Potter........................... 73/231 R
3,344,666   10/1967  Rilett............................ 73/231 M FOREIGN PATENTS OR APPLICATIONS
781,363   8/1957   United Kingdom................ 324/174
803,069   10/1958  United Kingdom................ 73/231 R
1,132,326  10/1956  France........................... 73/231 R

*Primary Examiner*—Richard C. Queisser
*Assistant Examiner*—John P. Beauchamp

[57] ABSTRACT

A turbine-type flowmeter having rotating turbine blades and a pickup device operating in response to the rotation of the turbine blades to produce corresponding output signals and comprising a yoke structure having an outer end and a plurality of inner ends, a single permanent magnet contacting the outer end of the yoke structure, and at least one coil wound around the yoke structure and producing the output signals in response to variations in the magnetic induction produced within the yoke structure by the rotation of the turbine blades.

8 Claims, 8 Drawing Figures

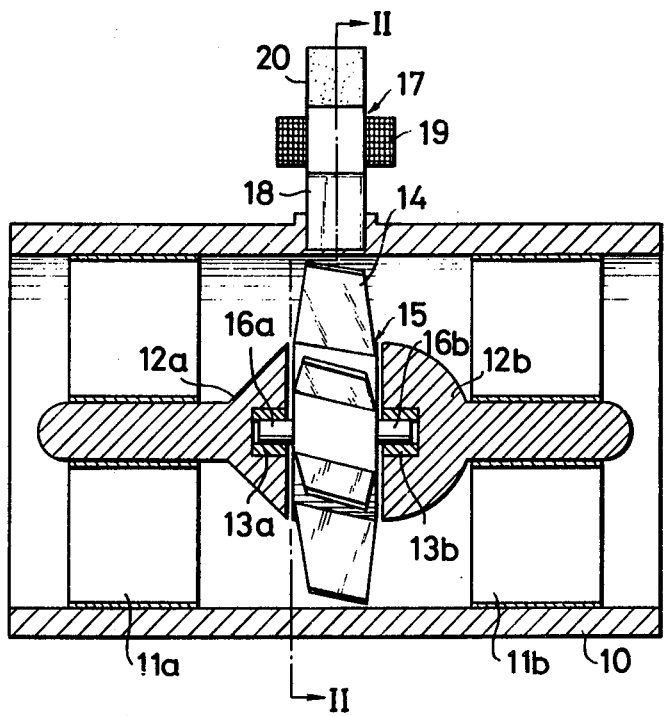
FIG. I
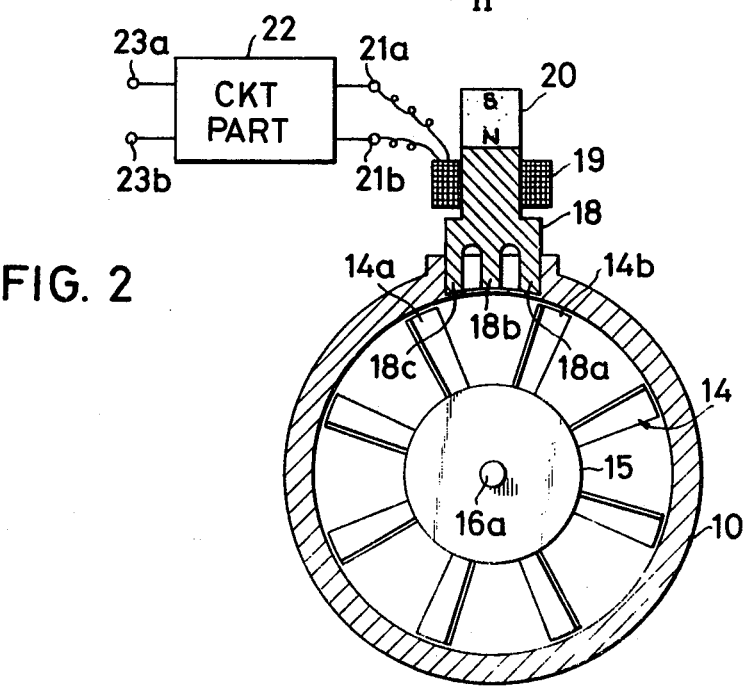
FIG. 2

TURBINE-TYPE FLOWMETER

BACKGROUND OF THE INVENTION

This invention relates generally to a turbine-type flowmeter and more particularly to a turbine-type flowmeter having turbine blades and a pickup device installed on the outer casing thereof and operating to detect the rotation of the turbine blades and to transmit an output signal indicative of the flow quantity.

In a turbine-type flowmeter, in general, the device for measuring the flow quantity of the fluid flowing through the flowmeter detects, through a pickup coil of a pickup device mounted on the flowmeter outer casing, changes of the magnetic flux passing through the pickup device in accordance with the rotation of the turbine blades and measures the flow quantity as electrical pulse signals.

For improvement of the accuracy of measurement of a flowmeter of this character, it is necessary that the number of output pulse signals derived per unit flow quantity be large, is, that the frequency be high.

In one known turbine-type flowmeter intended to increase its accuracy by meeting this requirement, a ring is mounted on the peripheral edges of a plurality of turbine blades, and a large number of permanent magnets are fixedly mounted on this ring. By this known arrangement, output pulses of the same number as the permanent magnets mounted on the ring can be obtained from a single pickup device for each revolution of the turbine blade wheel or turbine rotor, and the number of these output pulses per unit flow quantity can be increased by increasing the number of the permanent magnets.

In this known flowmeter, however, the turbine rotor itself becomes quite heavy since a ring, permanent magnets, and other parts are fixedly mounted on the turbine blades. Because of this large weight (i.e., mass) of the turbine rotor, the response to fluctuations in the flowrate is poor. Another problem due to this large weight is that a large load is imparted to the bearings of the rotor shaft, whereby the instrument error increases and, moreover, the durability of the flowmeter is impaired.

In another example of a known turbine-type flowmeter intended to improve the measurement accuracy, a plurality of pickup devices are independently provided on the outer casing and operate in cooperation with the turbine blades to detect the rotation of these turbine blades.

In this known flowmeter, however, a plurality of pickup devices are provided, and, moreover, the receiver for receiving the output signals of all pickup devices is provided with input circuits corresponding respectively with the pickup devices. As a result, the organization of the flowmeter becomes complicated and expensive.

SUMMARY OF THE INVENTION

Accordingly, it is a general object of the present invention to provide a new and useful turbine-type flowmeter in which the above described difficulties are overcome.

More specifically, an object of the invention is to provide a turbine-type flowmeter which can measure flow quantity with high accuracy with a large number of output pulses per unit flow quantity through the use of a pickup device of simple organization.

Another object of the invention is to provide a turbine-type flowmeter having a pickup device of simple organization wherein use is made of a single permanent magnet commonly for a plurality of pickup head parts.

Still another object of the invention is to provide a turbine-type flowmeter having a pickup device having a single pickup head core yet being capable of producing a large number of output pulses.

A further object of the invention is to provide a turbine-type flowmeter in which a plurality of pulses of respective different levels are derived as each group, and in which there is provided a pickup device adapted to cause the group pulses to be derived successively and repeatedly. By suitably selecting the threshold level in the receiving part for receiving these output pulses, it is possible to count the pulses with an appropriate cyclic period.

Further objects and features of the invention will be apparent from the following detailed description with respect to preferred embodiments of the invention when read in conjunction with the accompanying drawings.

BRIEF DESCRIPTION OF THE DRAWINGS

In the drawings:

FIG. 1 is a side view, in longitudinal section, showing the essential parts of one embodiment of a turbine-type flowmeter according to the invention;

FIG. 2 is a cross-sectional view taken along line II—II in FIG. 1;

DETAILED DESCRIPTION

Figure 3:
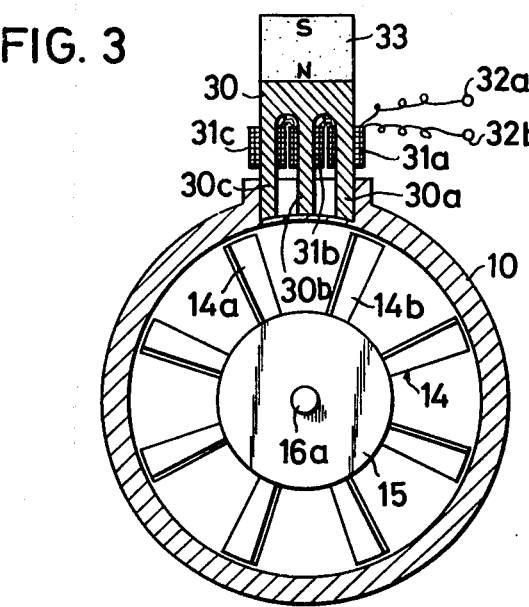
FIG. 3 is a cross-sectional view of a second embodiment of the turbine-type flowmeter according to the invention.

In a first embodiment of the turbine-type flowmeter according to the present invention as illustrated in FIGS. 1 and 2, the outer shell or casing 10 of the flowmeter is of cylindrical shape and is adapted to be inserted in a pipe line constituting a flowpath of a fluid to be measured, the two open ends of the casing 10 being coupled to the pipe line.

Support frames 11a and 11b are disposed within mutually spaced apart relationship in tandem in the longitudinal direction within the casing 10 and fixed to the inner wall surface thereof. At their central parts, these support frames 11a and 11b support rod-like parts of bearing holders 12a and 12b, the rod-like parts being fitted into and fixed to the support frames 11a and 11b, respectively. These rod-like parts of the bearing holders 12a and 12b are integrally and coaxially formed with respective conical or hemispherical parts of larger outer diameter, which are mutually spaced apart and coaxially aligned and respectively support at their central parts coaxially aligned bearings 13a and 13b fitted thereinto and fixed thereto.

The bearings 13a and 13b rotatably support rotatable shafts 16a and 16b fixed to and coaxially extending outward from opposite sides of the central part of the hub or rotor 15 of the flowmeter turbine. The rotor 15, which is thereby free to rotate within the casing 10, is provided with a plurality of, for example, eight, turbine blades 14 embeddedly fixed thereto. These turbine blades 14 are made of a magnetic material.

At a position on the outer casing 10 to confront the tips of the blades 14, the inner end (lower end as viewed in FIGS. 1 and 2) of a yoke 18 of a pickup device 17 is embeddedly fixed in the wall of the casing 10. The inner end, that is, the lower end, of the yoke 18 is divided into three forked leg parts 18a, 18b, and 18c in equally spaced relationship and with an overall width in the circumferential direction of the casing 10 to lie within the spacing between adjacent turbine blades 14a and 14b.

A single wound coil 19 is provided around the middle shank part of the yoke 18 radially outside of the leg parts 18a, 18b, and 18c. To the outermost end (upper end as viewed in FIGS. 1 and 2) of the yoke, there is fixed a single permanent magnet 20, which has magnetic poles in the longitudinal direction (i.e., the vertical direction in FIGS. 1 and 2) of the yoke 18.

The coil 19 has two terminals 21a and 21b connected to a circuit part 22, which includes circuits such as an amplifier circuit for amplifying signals and a waveshaping circuit for changing signals into waveforms suitable for subsequent operations such as counting and controlling. The output signals of this circuit part 22 are supplied by the terminals 23a and 23b to a counter or control equipment or the like (not shown).

The flowmeter of the above described construction and arrangement according to the invention operates as follows.

When a fluid to be measured flows through the flowmeter outer casing 10, for example, from left to right in FIG. 1, the blades 14 and the turbine rotor 15 are rotated in the counterclockwise direction as viewed in FIG. 2 at a rotational speed proportional to the flowrate of the fluid.

On the one hand, the yoke 18 is magnetized by the permanent magnet 20, and magnetic flux is continually emanating respectively from the extreme ends of the leg parts 18a, 18b, and 18c of the yoke.

As the turbine blades 14 rotate in the above described manner at a rotational speed proportional to the flowrate of the fluid being measured, the individual blades 14a, 14b, 14c, . . . of the plurality of blades 14 successively pass through positions confronting the end surfaces of the leg parts 18a, 18b, and 18c of the yoke 18. During this operation, the density of magnetic flux or intensity of magnetic field passing through the yoke 18 varies each time one of the blades, for example, the blade 14a, passes through its position confronting the leg parts 18a, 18b, and 18c. Consequently, an induced electromotive force porportional to this variation in the magnetic flux density is induced in the coil 19.

As a result, each time the blades 14a, 14b, 14c, . . . respectively and successively pass the leg parts 18a, 18b, and 18c, the coil 19 produces an AC output signal. Since the inner end of the yoke is divided into three leg parts 18a, 18b, and 18c, output signals can be obtained with a frequency which is 3 times per revolution of the rotor 15 that in the case where the inner end of the yoke is a single end part. Therefore, the measurement accuracy is 3 times higher.

In a similar manner, in order to increase the measurement accuracy, three pickup devices each comprising a yoke, a permanent magnet, and coil have heretofore been installed independently at positions corresponding to the above described leg parts 18a, 18b, and 18c. In this known device, however, since parts such as a permanent magnet and coil are necessary for each of the three pickup devices, the cost of the entire flowmeter becomes high. This drawback is overcome in the instant embodiment of the flowmeter according to the invention since only a single coil and a single permanent magnet are used. Furthermore, since the leg parts 18a, 18b, and 18c are formed unitarily with and on the yoke shank body, the mutual spacing therebetween is determined, and there is no necessity of adjusting their positions.

A second embodiment of the turbine-type flowmeter according to the present invention is illustrated in FIG. 3, in which, parts which are the same as parts in FIG. 2 are designated by like reference numerals. Detailed description of these parts will not be repeated in the following disclosure.

The inner (or lower) end of a yoke 30 is embeddedly fixed in the outer casing 10 of the flowmeter and has three leg parts 30a, 30b, and 30c of lengths such as to extend also outside of the outer casing 10. On the outer (upper) end of the yoke 30, there is fixedly mounted a permanent magnet 33. Coils 31a, 31b, and 31c are individually wound respectively around the parts of the leg parts 30a, 30b, and 30c disposed outside of the outer casing 10. These coils 31a, 31b, and 31c are connected in series or in parallel and are connected by way of output terminals 32a and 32b to a circuit similar to the aforedescribed circuit 22.

In the instant embodiment of the flowmeter, similarly as in the flowmeter of the preceding embodiment, signals are also successively generated from the coils 31a, 31b, and 31c as the turbine blades 14 successively pass through positions confronting the leg parts 30a, 30b, and 30c, whereby output signals are successively obtained from the output terminals 32a and 32b.

Figure 4:
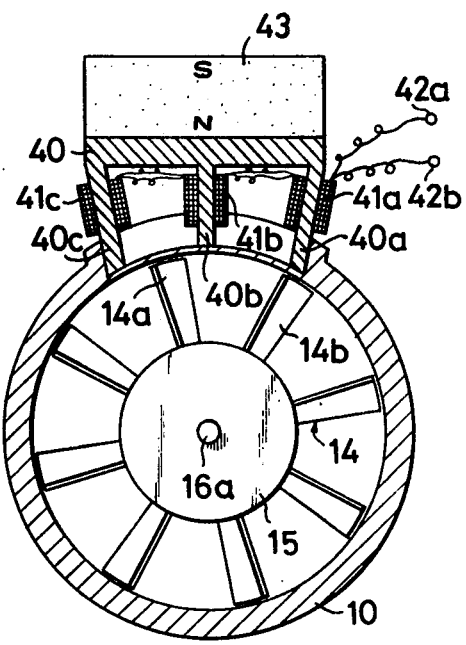
FIG. 4 is a cross-sectional view of a third embodiment of the turbine-type flowmeter according to the invention.

A third embodiment of the turbine-type flowmeter according to the present invention is shown in FIG. 4. In both of the preceding embodiments illustrated in FIGS. 2 and 3, the three leg parts of the yoke are so set as to be positioned between two adjacent turbine blades. The invention is not so limited, however, and the three leg parts of the yoke need not all be positioned to be between two adjacent blades, as in the instant third embodiment in FIG. 4.

The yoke 40 in the flowmeter shown in FIG. 4 has three leg parts 40a, 40b, and 40c, which are of such dimensions that the overall distance across the outermost leg parts 40a and 40c thereof is greater than the spacing between two adjacent turbine blades 14a and 14b. These leg parts 40a, 40b, and 40c are wound with respective coils 41a, 41b, and 41c. A permanent magnet 43 is fixedly mounted on the upper end of the yoke 40. The coils 41a, 41b, and 41c are connected in series or in parallel, and output signals therefrom are led out through output terminals 42a and 42b.

Figure 5:
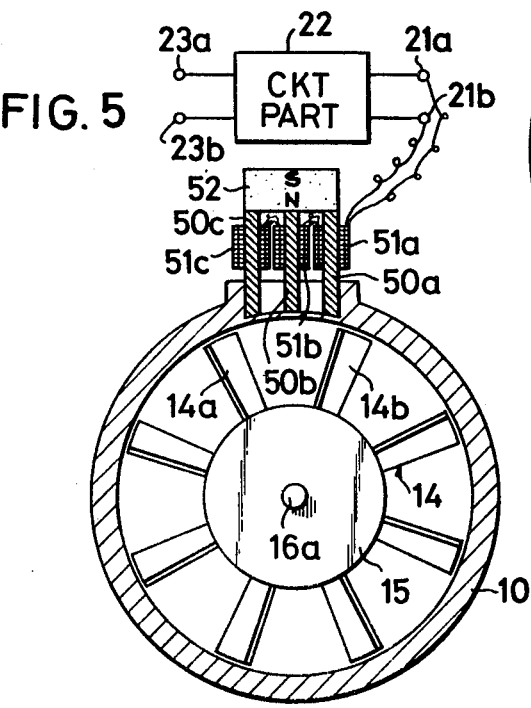
FIG. 5 is a cross-sectional view of a fourth embodiment of the flowmeter according to the invention.

In a fourth embodiment of the flowmeter according to the invention as illustrated in FIG. 5, yokes 50a, 50b, and 50c are constituted separately and are wound respectively with coils 51a, 51b, and 51c. A single permanent magnet 52 is fixedly mounted commonly on the upper ends of the yokes 50a, 50b, and 50c. The description of the flowmeter of this embodiment will be omitted since it can be easily understood from the description of the preceding embodiments.

Figure 6:
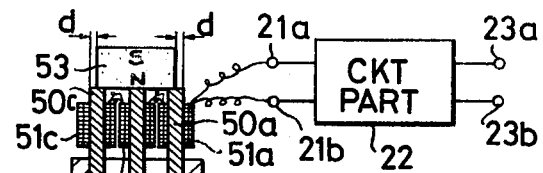
FIG. 6 is a cross-sectional view of a fifth embodiment of the flowmeter according to the invention.

A fifth embodiment of the turbine-type flowmeter according to the invention is illustrated in FIG. 6, in which parts which are the same as parts shown in FIG. 5 are designated by like reference numerals, but detailed description thereof will be omitted. In the case where the shapes, dimensions, and mutual spacing of the yokes 50a, 50b, and 50c in each of the fourth and fifth embodiments are the same, the width dimension of the permanent magnet 53 in the instant fifth embodiment is somewhat smaller than that of the permanent magnet 52 in the preceding fourth embodiment.

That is, in the preceding fourth embodiment, the width dimension of the permanent magnet 52 is equal to or greater than the distance between the outer sides of the yokes 50a and 50c. For this reason, all of the upper end surfaces of the yokes 50a, 50b, and 50c are in close contact with the magnet 52. In contrast, the width dimension of the permanent magnet 53 in the instant fifth embodiment is made smaller than the distance between the outer sides of the yokes 50a and 50c, and a space d exists between each outer side surface of the magnet 53 and the outer side surface of the yoke 50a or 50c on the same side. Accordingly, the entire upper end surface of the yoke 50b positioned in the middle in the instant embodiment is in close contact with the magnet 53, but only a portion of each of the upper end surfaces of the yokes 50a and 50c positioned on the two sides is in close contact with the magnet 53.

Figure 7:
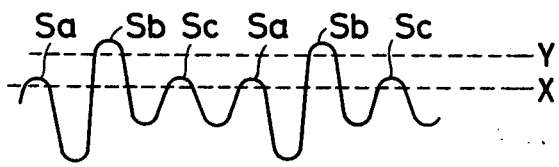
FIG. 7 is a graphical representation indicating the waveform of the output pulses of the flowmeter shown in FIG. 6 and the threshold level of the receiving section.

For this reason, in the instant fifth embodiment, the magnetic flux emanating from the central yoke 50b is most intense, and that emanating from each of the side yokes 50a and 50c is less intense. As a consequence, as the turbine blades 14 rotate, a signal Sb of high level is obtained from the coil 51b wound around the yoke 50b, while signals Sa and Sc of lower level are obtained from the coils 51a and 51c wound around the yokes 50a and 50c as indicated in FIG. 7. These signals are successively and continuously produced in the sequence of Sa, Sb, Sc, Sa, Sb, Sc, . . . as the turbine blades 14 rotate.

In this case, also, these output signals of the coils 51a, 51b, and 51c are supplied to the circuit section 22 for waveshaping. By selecting the threshold level of this waveshaping operation at a level X lower than the pulse-height level of the lower level signals Sa and Sc as indicated in FIG. 7, an output measuring signal of a frequency $f_1$ determined by the repetitive period of the signals Sa, Sb, and Sc can be obtained. On the other hand, by selecting this threshold level of the circuit section 22 at a suitable value Y between the pulse height level of the lower level signals Sa and Sc and the pulse height level of the high level signal Sb as indicated in FIG. 7, an output measuring signal of a frequency $f_2$ which is determined by the repetitive period of the signal, that is, which is one-third of the above mentioned frequency $f_1$, can be obtained.

Accordingly, by changing over the operational threshold level of the circuit section 22 between the levels X and Y, it is possible to change over the frequency of the pulse signal obtained from the circuit section 22 between $f_1$ and $f_2$. Then, in accordance with the purpose of utilization of the output signal of the circuit section 22, an output signal of appropriate frequency can be obtained. Accordingly, in the case where, for example, it is necessary to carry out measurement with high precision for correction of instrument error of the flowmeter, the above mentioned threshold level is advantageously set at the level X, while in the case where the response of the counting operation of an ordinary counter for flow quantity measurement is relatively slow, the threshold level is advantageously set at the level Y.

As one embodiment of modification of the above described embodiment flowmeter, the number of winding turns of the coils 51a, 51b, and 51c are varied, while shape relationships of the yokes and the permanent magnet are retained as in the embodiment shown in FIG. 5. That is, for example, the number of turns of the coil 51b may be made greater than that of each of the coils 51a and 51b. In this case, similarly in effect as in the embodiment illustrated in FIG. 6, an output signal of high level is obtained from the coil 51b, while output signals of lower level are obtained from the coils 51a and 51c.

In a modification of the above described embodiment, the positions of the yokes 50a and 50c positioned on two sides with respect to the single permanent magnet 53 are made variable, the yokes 50a and 50c being adapted to be displaceable between positions at which their entire upper surfaces make contact with the magnet 53 and positions at which only portions of their upper surfaces contact the magnet as shown in FIG. 6.

In this case, when the yokes 50a, 50b, and 50c are in positions where their entire upper surfaces contact the magnet 53, all output signals are obtained at a high level value wherein their pulse height level value is equal to that of the signal Sb. On the other hand, when the yokes 50a and 50c are set at positions as indicated in FIG. 6, the levels of the output signals assume the states indicated in FIG. 7. Accordingly, when the operational threshold level of the circuit section 22 is fixed at the above mentioned level Y, there is no necessity of changing over the threshold level of the circuit section 22, and the frequency of the output signals can be changed over between $f_1$ and $f_2$ merely by varying the positions of the yokes 51a and 51c.

In the case where the yokes 50a and 50c are displaced, the periods of the output signals obtained from the coils 51a, 51b, and 51c vary slightly, but there is no variation in the period of the total output signal.

Figure 8:
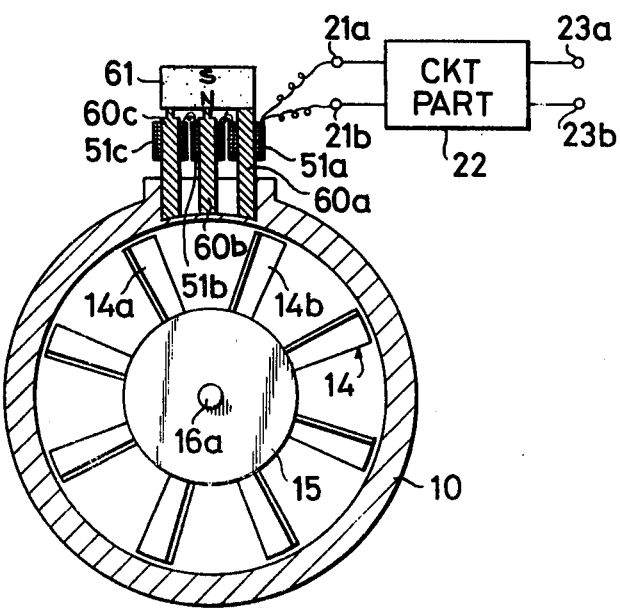
FIG. 8 is a cross-sectional view of a sixth embodiment of the flowmeter according to the invention.

In a sixth embodiment of the turbine-type flowmeter according to the invention as illustrated in FIG. 8, yokes 60a, 60b, and 60c have upper surfaces for contacting a permanent magnet 61 which are different in shape. That is, the area of the upper part of the yoke 60a for contacting the magnet 61 is large, while those of the yokes 60b and 60c are relatively small. For this reason, the magnetic flux emanating from the end of the yoke 60a is dense, while those emanating from the ends of the yokes are less dense.

Accordingly, the level of the output signal of the coil 51a wound around the yoke 60a is high, while those of the coils 51b and 51c wound around the yokes 60b and 60c are relatively low. Therefore, by changing over the operational threshold level of the circuit section 22, between the levels X and Y, similarly as in the fifth embodiment described with reference to FIGS. 6 and 7, an output signal of a frequency which is changeable between the frequencies $f_1$ and $f_2$ can be obtained.

While, in the above described embodiments, three leg parts of the yoke or three separate yokes are used, this number of leg parts or yokes is not limited to three but may be any plural number in the practice of the present invention. Furthermore, in the embodiments illustrated in FIGS. 6 and 8, the pulse height level values of the output signals may be caused to be more than three different levels.

Further, this invention is not limited to the disclosed embodiments but various variations and modifications thereof may be made without departing from the scope and spirit of the invention.

What we claim is:

1. A turbine-type flowmeter comprising:
   a flowmeter outer casing having therewithin a flowpath for flow therethrough of a fluid whose flowrate is to be measured;
   a turbine rotor rotatably supported within said casing and supporting a plurality of turbine blades of magnetic material rotated by said fluid flowing through said flowpath at a rotational speed in accordance with the flowrate of the fluid;
   a yoke structure mounted on and partly within the wall of the casing and having an outer end part, a shank body, and a plurality of inner end parts positioned to confront the radially outer ends of the blades as the blades rotate, at least more than one of said inner end parts being so arranged as to lie within a space interval corresponding to the space interval between two adjacent blades of said plurality of turbine blades;
   a single permanent magnet disposed in contact with the outer end part of said yoke structure, said permanent magnet producing magnetic flux passing through the yoke structure and inner end parts thereof; and
   coil means wound around a part of the yoke structure for generating output signals induced by the magnetic flux produced within the yoke structure and changing in accordance with changes of the magnetic flux each time one of the turbine blades passes through said position to successively confront each of the inner end parts of the yoke structure as the blades thus rotate.

2. A turbine type flowmeter as set forth in claim 1 in which said yoke structure comprises a single yoke having a plurality of leg parts including said inner end parts, said leg parts being branched from the shank body.

3. A turbine type flowmeter as set forth in claim 2 in which said coil means comprises a single coil wound around said shank body of the single yoke.

4. A turbine-type flowmeter as set forth in claim 2 in which said coil means comprises a plurality of coils wound around respective leg parts of the single yoke.

5. A turbine type flowmeter as set forth in claim 1 in which all of said plurality of inner end parts are so arranged as to lie entirely within a space interval corresponding to the space interval between two adjacent blades of said plurality of turbine blades.

6. A turbine-type flowmeter as set forth in claim 1 in which said yoke structure comprises a plurality of separate yokes all contacting said single permanent magnet, and said coil means comprises a plurality of coils respectively wound around said yokes.

7. A turbine-type flowmeter as set forth in claim 6 in which, of said plurality of yokes, at least one yoke has an area of contact with the permanent magnet which is different from those of the other yokes, and the output signals produced in said coils have different pulse height level values.

8. A turbine-type flowmeter as set forth in claim 6 in which, of said plurality of coils, at least one coil has a number of winding turns differing from those of the other coils, and the output signals produced in said coils have different pulse height level values.

* * * * *